United States Patent
Youn

(10) Patent No.: US 11,858,572 B2
(45) Date of Patent: Jan. 2, 2024

(54) PARALLEL CELL BASED MOBILITY PRODUCTION SYSTEM

(71) Applicants: Hyundai Motor Company, Seoul (KR); Kia Corporation, Seoul (KR)

(72) Inventor: Suk Jae Youn, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/450,893

(22) Filed: Oct. 14, 2021

(65) Prior Publication Data

US 2022/0227440 A1 Jul. 21, 2022

(30) Foreign Application Priority Data

Jan. 21, 2021 (KR) .................. 10-2021-0008682

(51) Int. Cl.
*B62D 65/04* (2006.01)
*B62D 65/00* (2006.01)
(Continued)

(52) U.S. Cl.
CPC ........... *B62D 65/04* (2013.01); *B62D 65/005* (2013.01); *B62D 65/06* (2013.01); *B62D 65/14* (2013.01); *B62D 65/16* (2013.01); *B62D 65/18* (2013.01)

(58) Field of Classification Search
CPC ......... Y10T 29/49828; Y10T 29/49829; Y10T 29/49831; B62D 65/00; B62D 65/02;
(Continued)

(56) References Cited

U.S. PATENT DOCUMENTS 5,239,739 A 8/1993 Akeel et al.
5,272,805 A * 12/1993 Akeel .............. G05B 19/41805
29/771

(Continued)

FOREIGN PATENT DOCUMENTS

GB 2373767 A 10/2002
JP 2003267278 A 9/2003
(Continued)

OTHER PUBLICATIONS

Hottenrott, A. et al., "Flexible layouts for mixed-model assembly of heterogeneous vehicles", OR Spectrum, 41:943-979, https://doi.org/10.1007/s00291-019-00556-x, Regular Article, May 13, 2019, 37 pages.

*Primary Examiner* — Sarang Afzali
*Assistant Examiner* — Darrell C Ford
(74) *Attorney, Agent, or Firm* — Slater Matsil, LLP

(57) ABSTRACT

A parallel cell based mobility production system is disclosed. The system includes a serial production line composed of a plurality of cells arranged in series, and through which the vehicles of various types are sequentially passed to be processed. The system further includes a parallel production line composed of a plurality of sublines arranged in parallel, wherein each subline is provided with the plurality of cells arranged in series and matched for each vehicle type, and in which a vehicle passing through the serial production line is fed to a corresponding subline for each vehicle type. Furthermore, the system includes an inspection line in which the vehicles of various types passing through the parallel production line are sequentially fed.

16 Claims, 5 Drawing Sheets

(51) Int. Cl.
  *B62D 65/06* (2006.01)
  *B62D 65/14* (2006.01)
  *B62D 65/16* (2006.01)
  *B62D 65/18* (2006.01)

(58) Field of Classification Search
  CPC .... B62D 65/022; B62D 65/024; B62D 65/04; B62D 65/06; B62D 65/10; B62D 65/12; B62D 65/14; B62D 65/16; B62D 65/18
  USPC .......................................................... 29/430
  See application file for complete search history.

(56) References Cited

U.S. PATENT DOCUMENTS

| | | | | |
|---|---|---|---|---|
| 6,324,749 | B1 * | 12/2001 | Katsuura | B23P 21/004 29/430 |
| 7,306,088 | B2 * | 12/2007 | Fenzl | B23P 21/004 198/346.2 |
| 8,229,586 | B2 * | 7/2012 | Wallace | B23P 19/042 700/114 |
| 10,065,694 | B1 * | 9/2018 | Rompage | B62D 25/06 |
| 2002/0152615 | A1 | 10/2002 | Kurihara | |
| 2003/0101578 | A1 | 6/2003 | Moriya et al. | |
| 2003/0208893 | A1 * | 11/2003 | Kilibarda | B23K 37/0452 29/407.01 |
| 2005/0087426 | A1 * | 4/2005 | Fenzl | B62D 65/00 198/346.2 |
| 2005/0198804 | A1 * | 9/2005 | Koren | B23P 21/004 29/430 |
| 2009/0000103 | A1 * | 1/2009 | Muhlenkamp | B65G 37/02 29/428 |
| 2016/0325611 | A1 * | 11/2016 | Kim | B23P 19/10 |
| 2018/0354083 | A1 * | 12/2018 | Thorwarth | B23P 21/004 |
| 2019/0185085 | A1 * | 6/2019 | Toeniskoetter | B62D 65/022 |
| 2020/0130115 | A1 * | 4/2020 | Vetter | B62D 65/18 |

FOREIGN PATENT DOCUMENTS

| | | |
|---|---|---|
| JP | 3547118 B2 | 4/2004 |
| KR | 20190049107 A | 5/2019 |
| WO | 0147661 A1 | 7/2001 |
| WO | 2012169321 A1 | 12/2012 |

* cited by examiner

PARALLEL CELL BASED MOBILITY PRODUCTION SYSTEM

CROSS-REFERENCE TO RELATED APPLICATIONS

The present application claims priority to Korean Patent Application No. 10-2021-0008682, filed Jan. 21, 2021, the entire contents of which is hereby incorporated herein for all purposes by this reference.

TECHNICAL FIELD

Embodiments generally relate to a parallel cell based mobility production system and a vehicle production method for preparing for the future.

BACKGROUND

Conventionally, a mass production method of certain kinds of small items has been operated centering on conveyors. However, in the future society to come, industry changes are progressing around electric vehicles, and it is expected that a change in customer-centric manufacturing methods is required to respond to customer needs where diversity is emphasized.

In conventional production line, vehicles are supplied according to a consistent sequence, and manufacturing process is performed in a consistent sequence until a finished vehicle is released. The working hours of all processes are the same, and vehicles with parts exceeding the working hours are difficult to be supplied or result in limitations in production. In other words, it is believed that there will be difficulties in responding to various customer needs in the future society while maintaining a manufacturing structure that allows only mass production of certain small items.

Therefore, it is necessary to break away from the traditional vehicle manufacturing method and to innovate a manufacturing method that can easily and quickly produce a variety of vehicles at one point.

The matters described as the background art are only for enhancing an understanding of the background of the present invention, and should not be taken as acknowledging that they correspond to the prior art already known to those of ordinary skill in the art.

SUMMARY

Embodiments are proposed to solve the problems and provide a parallel cell based mobility production system capable of responding to various customer needs by producing vehicles of various types together when producing vehicles, continuing productions and increasing production without shutdown or separate construction even in the event of an abnormal situation during the process, securing flexibility by setting the operation of each cell individually, rapidly changing production facilities according to rapid changes in product cycles, and installing and operating in factories inside buildings in downtown rather than outside factories.

In order to achieve the object above, an embodiment parallel cell based mobility production system is a parallel cell based mobility production system for producing vehicles of various types with one production system, including a serial production line which is composed of one or more cells arranged in series, and through which vehicles of various types are sequentially passed to be processed, a parallel production line which is composed of a plurality of sublines arranged in parallel, each subline provided with a plurality of cells arranged in series and matched for each vehicle type, and in which the vehicle passing through the serial production line is fed to a corresponding subline for each vehicle type, and an inspection line in which the vehicle of various types passing through the parallel production line are sequentially fed.

The serial production line may perform a pre-task and a chassis installation process.

The serial production line may be composed of a plurality of cells arranged in series, and each cell performs a pre-task and a chassis installation process in sequence.

The serial production line may be composed of sequentially arranged pre-task cell, chassis alignment task cell, drive module installation cell, and chassis mounting cell, and vehicles of various types may sequentially pass through each cell and be processed.

A plurality of cells to which a unique task is assigned may be serially arranged in the sublines of the parallel production line, and the plurality of sublines may share a corresponding cell for a certain task.

The sublines of the parallel production line may be composed of sequentially arranged indoor and outdoor trim task cell, optional part mounting cell, bumper mounting cell, wheel mounting cell, and door mounting cell, and a vehicle of type corresponding to the subline may sequentially pass through each cell and be processed.

The optional part mounting cell, wheel mounting cell, and door mounting cell of the subline may be provided in a smaller number than a total number of the sublines, and each subline may share the optional part mounting cell, the wheel mounting cell, and the door mounting cell with each other.

The indoor and outdoor trim task cell may be composed of sequentially arranged first cell, second cell, and third cell, and the first cell may perform one or more of vehicle wiring installation, seat belt installation, and roof rack installation.

The indoor and outdoor trim task cell may be composed of sequentially arranged first cell, second cell, and third cell, and the second cell may perform one or more of crash pad installation, headlining installation, and washer liquid reservoir installation.

The indoor and outdoor trim task cell may be composed of sequentially arranged first cell, second cell, and third cell, and the third cell may perform one or more of indoor trim installation, indoor console installation, air conditioning duct installation, and floor carpet installation.

The optional part mounting cell may perform one or more of sheet installation, glass installation, and FEM installation.

The bumper mounting cell may perform one or more of bumper installation, pedal installation, wiper installation, and wiring installation.

The wheel mounting cell may perform one or more of wheel installation, tire installation, and undercover installation.

The serial production line and the inspection line may be provided on both sides, respectively, and the parallel production line may be provided between the serial production line and the inspection line.

The plurality of sublines of the parallel production line may be continuously arranged in a vertical direction and a vehicle of type with a large number of productions may pass through the subline arranged at a top.

According to an embodiment parallel cell based mobility production system, it is possible to respond to various customer needs by producing vehicles of various types together when producing vehicles, to continue productions and increase production without shutdown or separate construction even in the event of an abnormal situation during the process, to secure flexibility by setting the operation of each cell individually, to rapidly change production facilities according to rapid changes in product cycles, and to install and operate in factories inside buildings in downtown rather than outside factories.

DETAILED DESCRIPTION OF ILLUSTRATIVE EMBODIMENTS

Embodiments are related to a parallel cell based mobility production system capable of responding to various customer needs by producing vehicles of various types together when producing vehicles, continuing productions and increasing production without shutdown or separate construction even in the event of an abnormal situation during the process, securing flexibility by setting the operation of each cell individually, rapidly changing production facilities according to rapid changes in product cycles, and installing and operating in factories inside buildings in downtown rather than outside factories.

Figure 1:
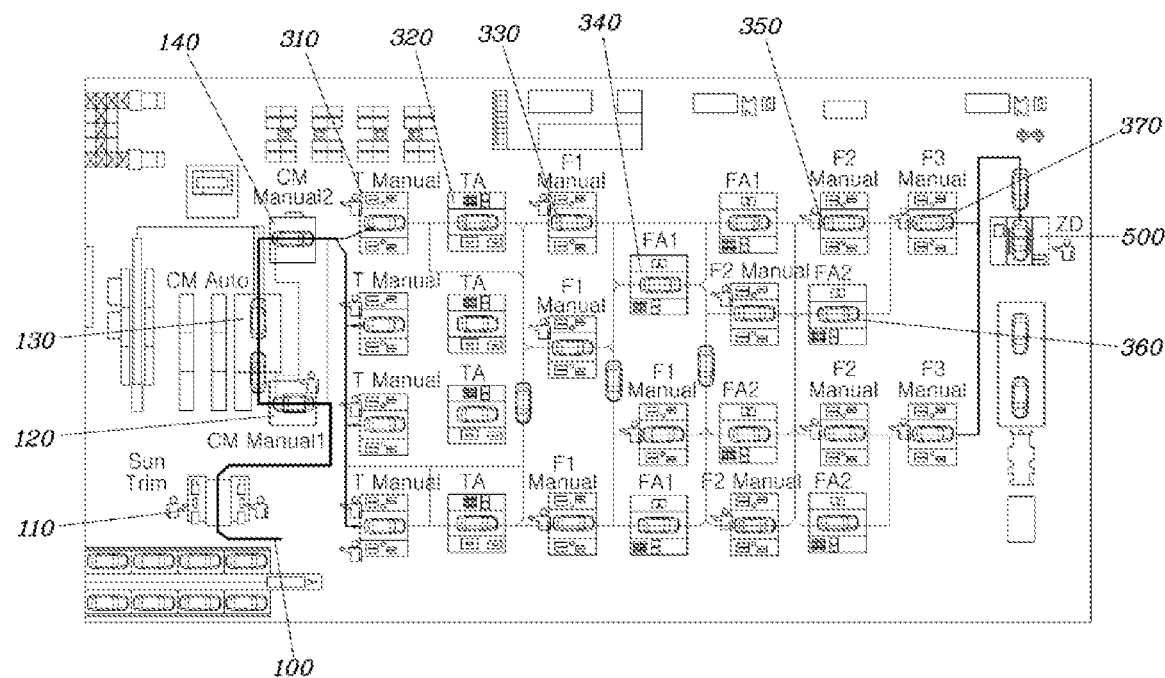
FIG. 1 is a configuration diagram of a parallel cell based mobility production system according to an embodiment.
Figure 2:
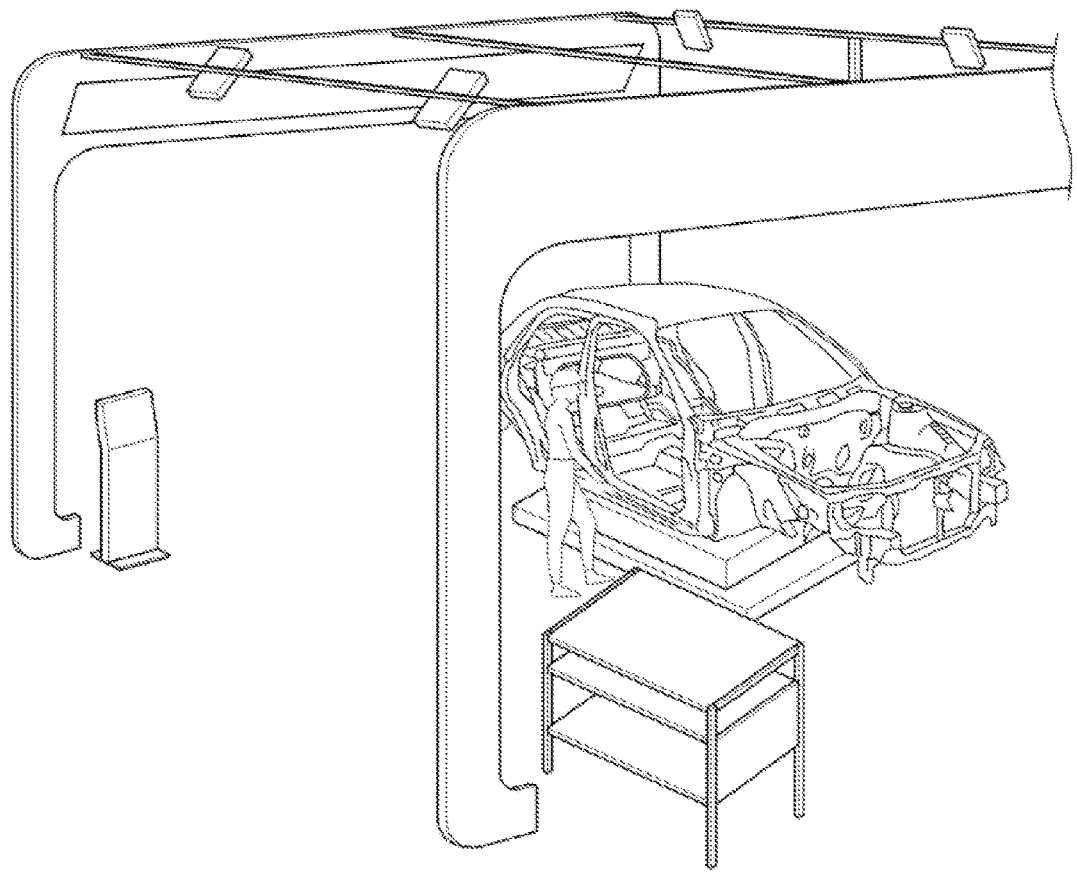
FIG. 2 is a diagram showing a passive cell of a parallel cell based mobility production system according to an embodiment.
Figure 3:
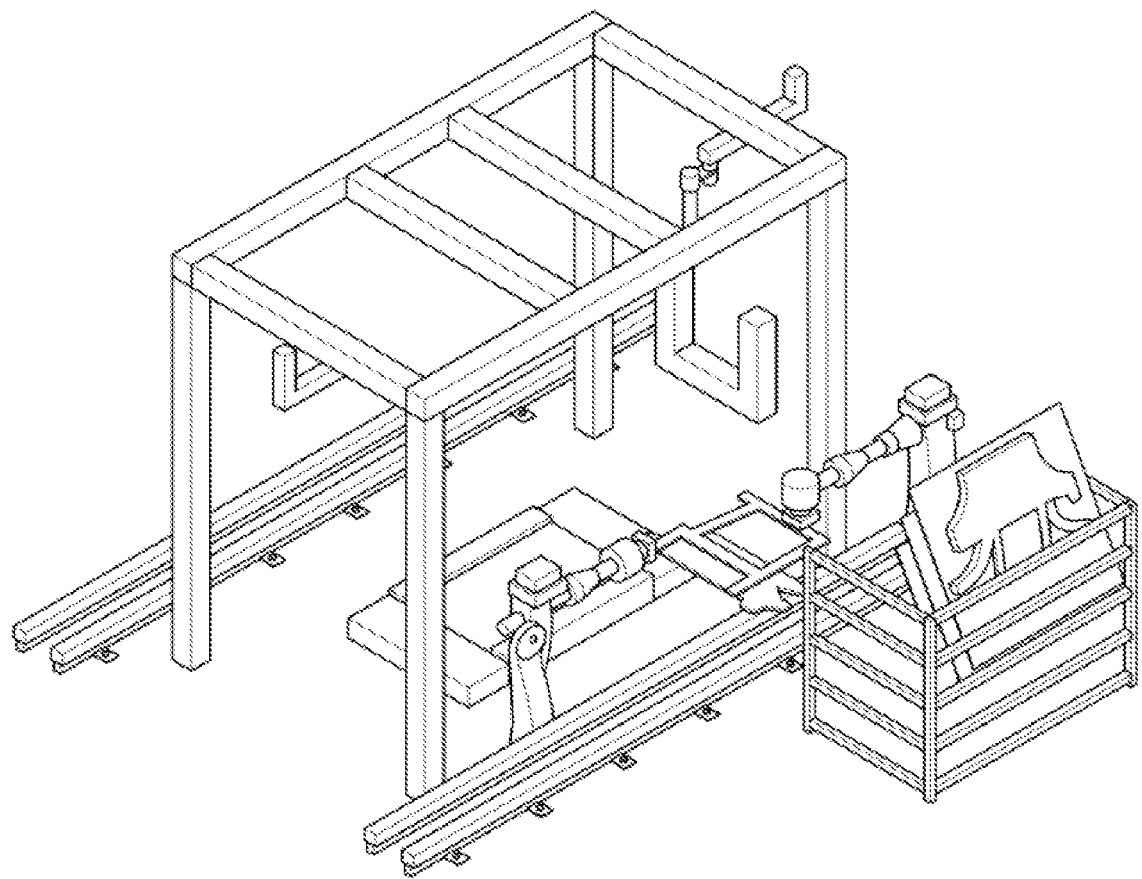
FIG. 3 is a diagram showing an automatic cell of a parallel cell based mobility production system according to an embodiment.
Figure 4:
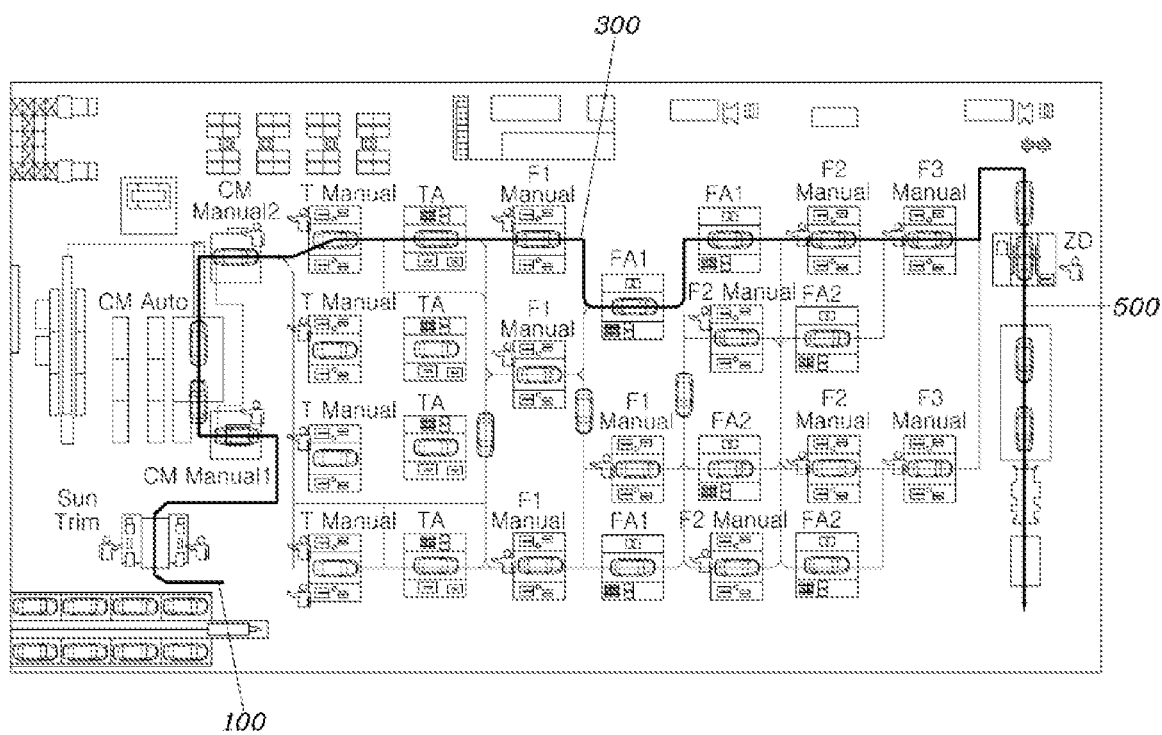
FIGS. 4 to 5 are diagrams showing an operation method of a parallel cell based mobility production system according to an embodiment.
Figure 5:
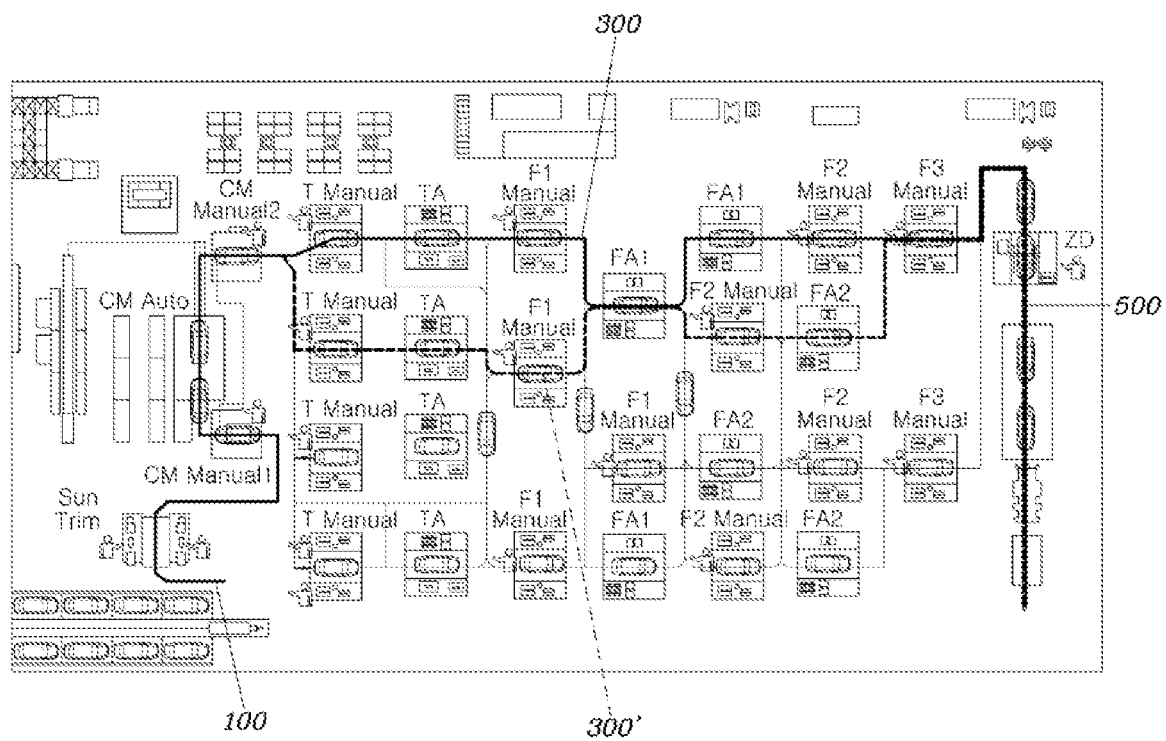

FIG. 1 is a configuration diagram of a parallel cell based mobility production system according to an embodiment, FIG. 2 is a diagram showing a passive cell of a parallel cell based mobility production system according to an embodiment, FIG. 3 is a diagram showing an automatic cell of a parallel cell based mobility production system according to an embodiment, and FIGS. 4 to 5 are diagrams showing an operation method of a parallel cell based mobility production system according to an embodiment.

FIG. 1 is a configuration diagram of a parallel cell based mobility production system according to an embodiment. The parallel cell based mobility production system according to an embodiment is a parallel cell based mobility production system capable of producing various vehicle models through a single production system. The system includes a serial production line 100 which is composed of one or more cells arranged in series, and through which vehicles of various types sequentially pass to be processed, a parallel production line 300 which is composed of a plurality of sublines arranged in parallel, each subline provided with a plurality of cells arranged in series and matched for each vehicle type, and in which the vehicle passing through the serial production line is fed to a corresponding subline for each vehicle type, and an inspection line 500 in which the vehicle of various types passing through the parallel production line are sequentially fed.

The vehicle production process is very complex and sequential. In the case of an embodiment, this is simplified into a serial production line 100, a parallel production line 300, and an inspection line 500. In addition, the serial production line 100 is an integrated series of common production processes, and is composed of processes in which the change in task is not large even though the vehicle types are different.

In addition, the parallel production line 300 is composed of a plurality of sublines 300 and each subline is arranged in parallel between the serial production line 100 and the inspection line 500. Also, each subline is responsible for the production of vehicles of different types.

Lastly, the inspection line 500 is a serial line through which all vehicle types commonly pass by performing sequential inspection on all vehicles.

Specifically, an embodiment parallel cell based mobility production system is intended to enable the production of vehicles of various types in one place. When the types of vehicles to be produced are various, there may be a difference in the installation order for each vehicle type. Further, even if the same type of task is performed, there may be a difference in the amount of task. Still further, the difference in optional parts may be large between vehicles, and there may be cases where a customer has ordered a separate special order. Thus, it is difficult to correspond with the conventional conveyor production system.

To this end, an embodiment proposes a parallel cell based mobility production system capable of producing various vehicle types through one production system. First, the serial production line 100 is composed of one or more cells arranged in series, and allows vehicles of various types to sequentially pass through so that the production operation is performed.

Further, the parallel production line 300 is composed of a plurality of sublines 300 arranged in parallel. Each subline 300 is provided with a plurality of cells arranged in series. In addition, each vehicle passing through the serial production line 100 is matched to a subline for each vehicle type, so that the vehicle passing through the serial production line 100 is fed to a corresponding subline for each vehicle type.

Still further, in the inspection line 500, the vehicles of various types that have passed through the parallel production line 300 are sequentially is fed, so that inspection and testing are sequentially performed.

First, the serial production line 100 may perform pre-task and chassis installation process. Specifically, the serial production line 100 is composed of a plurality of cells arranged in series, and each cell may perform pre-task and chassis installation process sequentially.

The serial production line 100 is composed of sequentially arranged pre-task cell 11o, chassis alignment task cell 120, drive module installation cell 130, and chassis mounting cell 140, and the vehicles of various types sequentially pass through each cell so that operation may be performed.

For example, in the pre-task cell 11o, a vehicle body is supplied and a pre-task process may be performed before chassis task. This may be a manual cell in which manual task is performed, and operations such as sunroof, engine room task, wiring input, etc. are performed. It is represented by Sun Trim in the drawing.

In the case of the chassis alignment task cell 120, it is represented by CM Manual 1 in the drawing, and operations such as a brake tube, EPCU, alignment task before decking, etc., are performed.

In the case of the drive module installation cell 130, it is represented by CM Auto in the drawing, and PE module and high voltage battery mounting are performed.

In the case of the chassis mounting cell 140, it is represented by CM Manual 2 in the drawing, and a wheel speed sensor, wheel guard, brake hose, etc., are installed.

After such a series of processes are sequentially performed for all vehicles, they are fed on the corresponding sublines for each vehicle type. In particular, by arranging the chassis mounting cell 140 on the serial production line 100, efficiency can be maintained since similar chassis operation is performed in different vehicle types. The parallel production line 300 can continuously configure trim lines for each vehicle type, so that production flexibility can be secured.

In the subline 300 of the parallel production line 300, a plurality of cells to which a unique task is assigned are serially arranged, and a plurality of sublines may share a corresponding cell for a certain task.

That is, the subline 300 of the parallel production line 300 is composed of sequentially arranged indoor and outdoor trim task cell, optional part mounting cell, bumper mounting cell, wheel mounting cell, and door mounting cell. A vehicle of the type corresponding to the subline may sequentially pass through each cell and the operation may be performed.

In addition, the number of optional part mounting cell, wheel mounting cell, and door mounting cell of the subline is provided in a smaller number than the total number of the sublines, so that each subline can share the optional part mounting cell, the wheel the mounting cell, and the door mounting cell with each other.

In addition, the indoor and outdoor trim task cell 310, 320, and 330 is composed of sequentially arranged first cell 310, second cell 320, and third cell 330. The first cell 310 is represented by manually T in the drawing, it can perform one or more of vehicle wiring installation, seat belt installation, and roof rack installation.

The indoor and outdoor trim task cell is composed of the sequentially arranged first cell, second cell, and third cell. The second cell 320 is represented by as TA in the drawing, and can perform one or more of crash pad installation, headlining installation, and washer liquid reservoir installation.

The indoor and outdoor trim task cell is composed of the sequentially arranged first cell, second cell, and third cell arranged in sequence. The third cell 330 is represented by F1 Manual in the drawing, and can perform one or more of indoor trim installation, indoor console installation, air conditioning duct installation, and floor carpet installation.

In addition, the optional part mounting cell 340 is represented by FA1 in the drawing, and may perform one or more of sheet installation, glass installation, and FEM installation.

The bumper mounting cell 350 is represented by F2 Manual in the drawing, and may perform one or more of bumper installation, pedal installation, wiper installation, and wiring installation.

The wheel mounting cell 360 is represented by FA2 in the drawing, and may perform one or more of wheel installation, tire installation, and undercover installation.

The door mounting cell 370 is represented by F3 Manual in the drawing, and in the cell a door and a weather strip are installed.

Each vehicle is assigned to a corresponding subline for each vehicle type, moves along the subline in which various parts are mounted. In addition, vehicles discharged from the sublines are sequentially introduced into the inspection line 500 to undergo various inspections and tests.

Meanwhile, as shown in drawings, the serial production line and the inspection line may be provided on both sides, respectively, and the parallel production line may be provided between the serial production line and the inspection line. In addition, the plurality of sublines of the parallel production line is continuously arranged in a vertical direction, and a vehicle type having a large number of productions may pass through the subline aligned above.

FIGS. 4 to 5 are diagrams showing an operation method of a parallel cell based mobility production system according to an embodiment. As shown in FIG. 4, the vehicle with the largest number of productions, for example, small-sized cars, may be produced through the subline 300 located at a highest level. Accordingly, the vehicle with the largest number of productions can be produced the fastest by forming a moving trajectory as close as possible to a straight line.

FIG. 5 shows that FA1 cell is shared, and as shown in FIG. 5, different sublines 300 and 300' share the optional part mounting cell located in the middle so that efficient production can be performed. For example, in the case of a cell that does not vary by vehicle type or is in charge of a relatively fast process, such as the optional part mounting cell, multiple sublines share the cell, thereby reducing production cost and increasing space utilization.

In the illustrated embodiment, the number (2 to 3) of the optional part mounting cell, wheel mounting cell, and door mounting cell of the subline is less than the total number (4) of sublines, and each subline can share the optional part mounting cell, the wheel mounting cell, and the door mounting cell with each other.

In addition, in the case of vehicles with relatively fast production flows such as small-sized cars, the subline 300 having the shortest moving distance is used, and in the case of large-sized cars, since the number of productions is small, the subline 300' located below is used. Accordingly, various vehicle types can be produced together, and efficiency can be increased by dualizing the production path when producing vehicles of various types together.

On the other hand, these cells can be divided into a manual cell in which a manual operation is performed and an automatic cell in which automatic assemblies are performed by a robot. FIG. 2 shows an embodiment of the manual cell, and FIG. 3 shows an embodiment of the automatic cell.

In addition, each cell can be easily moved within a factory, so production efficiency can be increased by efficient cell relocation. If maintenance or replacement of a specific subline is required, there is an advantage that production can be continuously performed without interruption by adding an extra subline and performing maintenance.

According to an embodiment parallel cell based mobility production system, it is possible to respond to various customer needs by producing vehicles of various types together when producing vehicles. Further, it is possible to continue productions and increase production without shutdown or separate construction even in the event of an abnormal situation during the process. Still further, it is possible to secure flexibility by setting the operation of each cell individually. Still further, it is possible to rapidly change production facilities according to rapid changes in product cycles, and to install and operate in factories inside buildings in downtown rather than outside factories.

Although shown and described in relation to specific embodiments of the present invention, it will be obvious to a person of ordinary knowledge in the art that the present invention can be variously improved and changed within the scope of the technical spirit of the present invention provided by the following claims.

What is claimed is:

1. A parallel cell based mobility production system for producing vehicles of various types with one production system, the system comprising:

a serial production line composed of a plurality of cells arranged in series, and through which the vehicles of various types are sequentially passed to be processed;

a parallel production line composed of a plurality of sublines arranged in parallel, each subline provided with the plurality of cells arranged in series and matched for each vehicle type, and in which a vehicle passing through the serial production line is fed to a corresponding subline for each vehicle type; and an inspection line in which the vehicles of various types passing through the parallel production line are sequentially fed, wherein the sublines of the parallel production line are composed of an indoor and outdoor trim task cell, an optional part mounting cell, a bumper mounting cell, a wheel mounting cell, and a door mounting cell, which are serially arranged, and wherein a vehicle of a type corresponding to the subline sequentially passes through each cell and is processed.

2. The system according to claim 1, wherein the serial production line performs a pre-task and a chassis installation process.

3. The system according to claim 1, wherein each cell performs a pre-task and a chassis installation process in an order corresponding to the cell.

4. The system according to claim 1, wherein the serial production line is composed of a pre-task cell, a chassis alignment task cell, a drive module installation cell, and a chassis mounting cell, which are sequentially arranged.

5. The system according claim 1, wherein the indoor and outdoor trim task cell is composed of a first cell, a second cell, and a third cell, which are sequentially arranged, and wherein the first cell performs one or more of a vehicle wiring installation, a seat belt installation, or a roof rack installation.

6. The system according claim 1, wherein the indoor and outdoor trim task cell is composed of a first cell, a second cell, and a third cell, which are sequentially arranged, and wherein the second cell performs one or more of a crash pad installation, a headlining installation, or a washer liquid reservoir installation.

7. The system according claim 1, wherein the indoor and outdoor trim task cell is composed of a first cell, a second cell, and a third cell, which are sequentially arranged, and wherein the third cell performs one or more of an indoor trim installation, an indoor console installation, an air conditioning duct installation, or a floor carpet installation.

8. The system according claim 1, wherein the optional part mounting cell performs one or more of a sheet installation, a glass installation, or a front electronic module (FEM) installation.

9. The system according claim 1, wherein the bumper mounting cell performs one or more of a bumper installation, a pedal installation, a wiper installation, or a wiring installation.

10. The system according claim 1, wherein the wheel mounting cell performs one or more of a wheel installation, a tire installation, or an undercover installation.

11. The system according to claim 1, wherein the parallel production line is provided between the serial production line and the inspection line.

12. The system according to claim 1, wherein the plurality of sublines of the parallel production line is continuously arranged in a vertical direction and the more vehicles are produced, the more the subline is disposed at a top.

13. A parallel cell based mobility production system for producing vehicles of various types with one production system, the system comprising:

a serial production line composed of a plurality of cells arranged in series, and through which the vehicles of various types are sequentially passed to be processed, each cell performing a pre-task and a chassis installation process in an order corresponding to the cell;

a parallel production line composed of a plurality of sublines arranged in parallel, each subline provided with the plurality of cells arranged in series and matched for each vehicle type, and in which a vehicle passing through the serial production line is fed to a corresponding subline for each vehicle type; and an inspection line in which the vehicles of various types passing through the parallel production line are sequentially fed, wherein the sublines of the parallel production line are composed of an indoor and outdoor trim task cell, an optional part mounting cell, a bumper mounting cell, a wheel mounting cell, and a door mounting cell, which are sequentially arranged, and wherein a vehicle of type corresponding to the subline sequentially passes through each cell and is processed.

14. The system according to claim 13, wherein the serial production line is composed of a pre-task cell, a chassis alignment task cell, a drive module installation cell, and a chassis mounting cell, which are sequentially arranged, and wherein the vehicles of various types sequentially pass through each cell and are processed.

15. The system according to claim 13, wherein the parallel production line is provided between the serial production line and the inspection line.

16. The system according to claim 13, wherein the plurality of sublines of the parallel production line is continuously arranged in a vertical direction and the more vehicles are produced, the more the subline is disposed at a top.

* * * * *